United States Patent [19]

Dippold

[11] 4,136,548
[45] Jan. 30, 1979

[54] TOOL FOR ATTACHING WEIGHTS TO FISHING LINE

[75] Inventor: William L. Dippold, St. Marys, Pa.

[73] Assignee: Elafuss, Inc., St. Marys, Pa.

[21] Appl. No.: 839,518

[22] Filed: Oct. 5, 1977

[51] Int. Cl.² ............................................. B21D 7/06
[52] U.S. Cl. ............................................ 72/409; 7/106
[58] Field of Search ....................... 72/409, 410; 7/106

[56] References Cited

U.S. PATENT DOCUMENTS

| | | | |
|---|---|---|---|
| 2,723,403 | 11/1955 | Miller | 7/106 |
| 2,765,687 | 10/1956 | Stanfield | 7/106 |
| 3,070,815 | 1/1963 | Marr | 7/106 |
| 3,162,869 | 12/1964 | Friedell | 7/106 |
| 3,172,319 | 3/1965 | Stanfield | 7/106 |

FOREIGN PATENT DOCUMENTS 548603 12/1957 Canada ...................................... 72/410

*Primary Examiner*—C.W. Lanham
*Assistant Examiner*—Gene P. Crosby
*Attorney, Agent, or Firm*—Bosworth, Sessions & McCoy

[57] ABSTRACT

A tool is disclosed for attaching slotted weights to a fishing line. The tool has a base having a channel and an opening for insertion of the fishing line traversing the channel. An abutment across the channel is located adjacent to the opening. A transfer block is slidably mounted within the channel in the body. The transfer block urges a slotted weight against the abutment to close the slot and attach the weight to the line. Means are provided for moving the transfer block within the channel in the base. The tool also includes a reservoir for storage of a plurality of slotted weights and discharging individual weights into the channel. The reservoir is preferably tubular with a single flat surface for maintaining the weights in proper orientation with a flat orienting surface opposite the slot. The tool also includes a weight removal device attached to be moved with the transfer block, which device opens the slot in the weight and removes the weight from the line.

8 Claims, 12 Drawing Figures

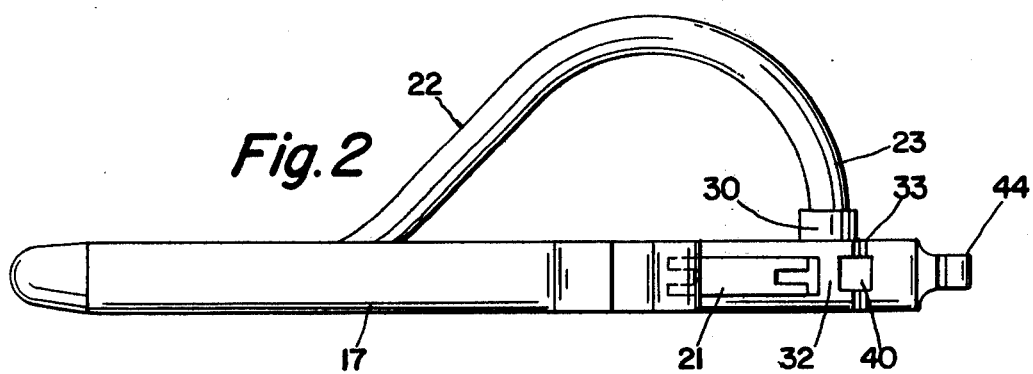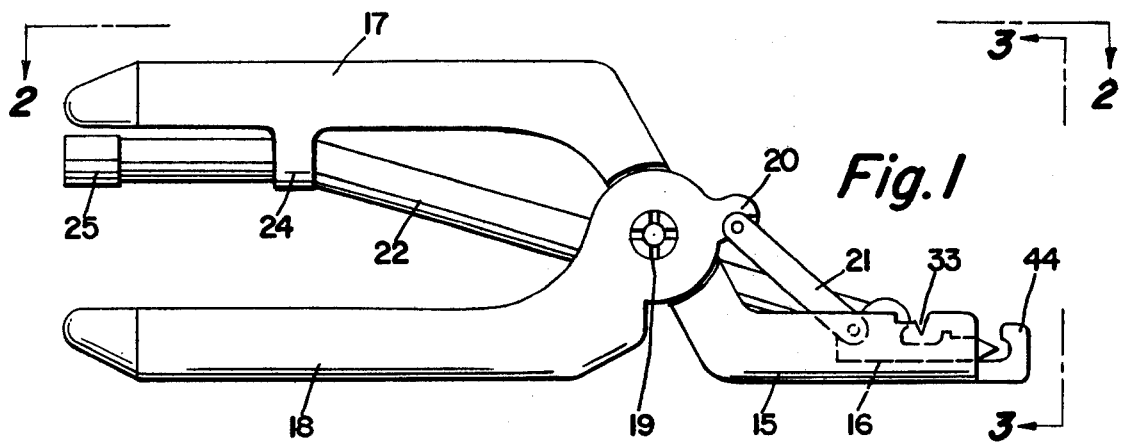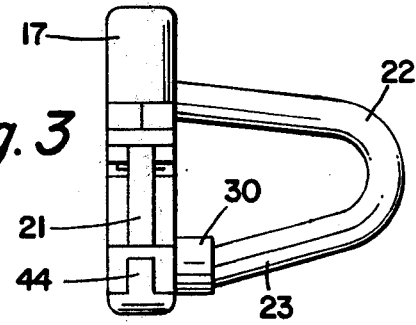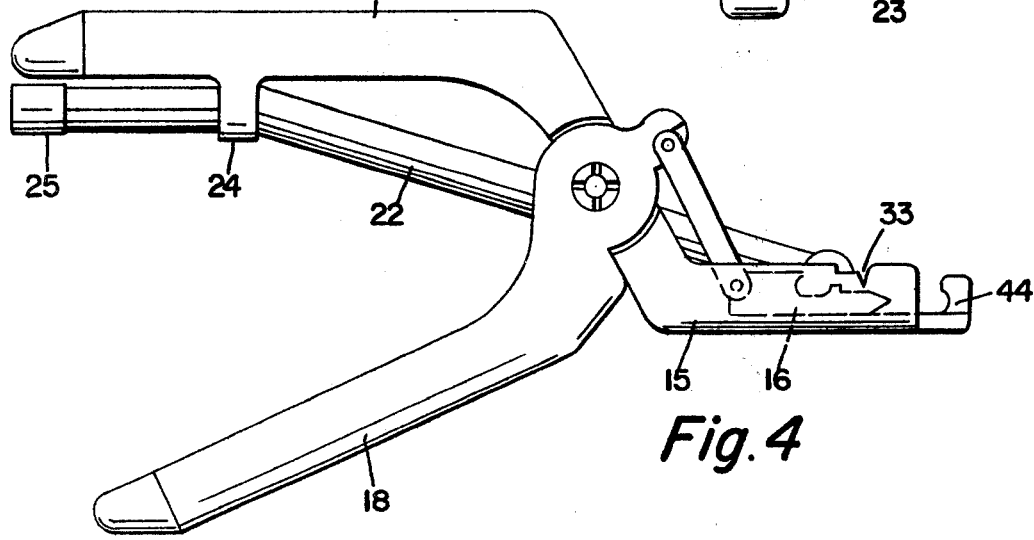

TOOL FOR ATTACHING WEIGHTS TO FISHING LINE

BACKGROUND OF THE INVENTION

This invention relates to a hand-operated tool for attaching slotted weights to a line, such as by crimping split-shot sinkers to a fishing line.

It is common practice to use weights for sinkers for fishing line. Such weights are usually made of lead, such as lead shot, and formed with a slot on one side. The fishing line is inserted into the slot, and the weight is then crimped around the line.

Weights are most often attached using a pair of pliers. A weight having a pre-formed slot is aligned in the end of a pair of pliers. The slot in the weight must be positioned so the line can be placed into the slot in the weight. The pliers are then squeezed together to pinch the weight onto the line.

Another practice in attaching a slotted weight to a fishing line requires the fisherman to hold the slotted weight between his thumb and index finger and place the line into the slot in the weight with his other hand. The fisherman then attaches the weight to the line by biting the weight with his teeth, thus crimping the weight onto the line. The weights are usually made of lead so that the crimping action can take place relatively easily, but it is a tedious manual operation, particularly when a number of lines are to be provided with weights or when a number of weights are attached to a single line.

Problems also arise for fisherman to get a slotted weight out of its container, properly position it on the leader or line, and then crimp it tightly into place. The small size of the weights makes holding them in the fingers very difficult, particularly when the hands are wet or cold.

Removing a weight is also laborious and time consuming. It is difficult to hold the small spherical weight while attempting to insert a blade into the original slot, and then apply the proper pressure to the blade without cutting the line. A sudden inadvertent rolling movement of the spherical weights can result in a ruined line or a cut finger. For this reason, it is often easier to cut the line and remove the weight, but it is often undesirable and otherwise unnecessary to cut the fishing line.

In an attempt to facilitate the application of slotted weights to fishing line, many devices have been devised, as noted for example in U.S. Pat. Nos. 3,583,202, 3,731,400, and 3,914,976. In each of these devices preslotted weights are loaded into a relatively complex magazine-type implement for a progressive feeding and mounting of the pre-formed weights. Many of these devices have also required a relatively expensive, specially formed chain or length of connected pieces of shot. The relatively complicated construction of the tool or of the specially formed weights was required to provide a slot on the weight in the proper alignment in the tool for insertion of the fishing line. Conventional weights are made from spherical lead shot, and it is extremely difficult to properly orient these spheres in an automatic tool with the slot in the proper position for insertion of the fishing line.

SUMMARY OF THE INVENTION

It is among the objects of the present invention to overcome the shortcomings, difficulties, and problems of the prior art practice for attaching slotted weights to a fishing line, either manually or with previously designed tools. The present invention comprises a tool having relatively few parts which can be inexpensively manufactured and which can effectively and easily attach weights to a fishing line. The tool has a relatively compact design, making it easy for the fisherman to carry and use. A reservoir for storing a plurality of slotted weights is provided in the tool so that the weights may be easily carried. The reservoir is generally tubular with a single flat surface to maintain in proper alignment generally cylindrical weights having a flat surface opposite the slot, such weights being as easy to manufacture as conventional slotted weights. The tool of the present invention also includes a device for removing weights which includes means for insertion into the closed slot to open the slot so that the weight may be removed without cutting the line. The present invention allows for the attachment of weights while eliminating the complex feed mechanisms of the prior art tools. With the present tool, weights are discharged from the reservoir one at a time and pinched onto a line in a simple and convenient manner. The tool crimps the weight to the line in a very secure manner, without the possibility of slippage or loss.

These and other objects are accomplished by the tool of the present invention which comprises a base having a channel and an opening for insertion of the fishing line traversing the channel. The base also has an abutment across the channel adjacent to the opening. A transfer block is slidable within the channel in the base. The transfer block urges the slotted weight against the abutment to crimp the weight and close the slot, thereby attaching the weight to the line. Means are provided for moving the transfer block within the channel. A reservoir which stores a plurality of slotted weights and discharges individual weights into the channel communicates with and extends perpendicularly from the channel.

BRIEF DESCRIPTION OF THE DRAWINGS

FIG. 1 is a side elevational view of the tool of the present invention in its closed position.

FIG. 2 is a top plan view of the tool taken along line 2—2 of FIG. 1.

FIG. 3 is a front elevational view of the tool taken along line 3—3 of FIG. 1.

FIG. 4 is a side elevational view of the tool similar to FIG. 1, showing the tool in its open position.

DETAILED DESCRIPTION OF THE PREFERRED EMBODIMENT

Figure 5:
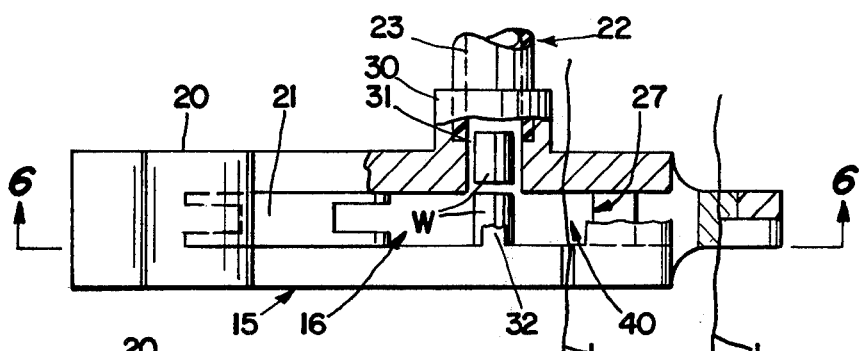
FIG. 5 is a top plan view partially sectioned of the tool in its open position to a larger scale than FIGS. 1-4.
Figure 6:
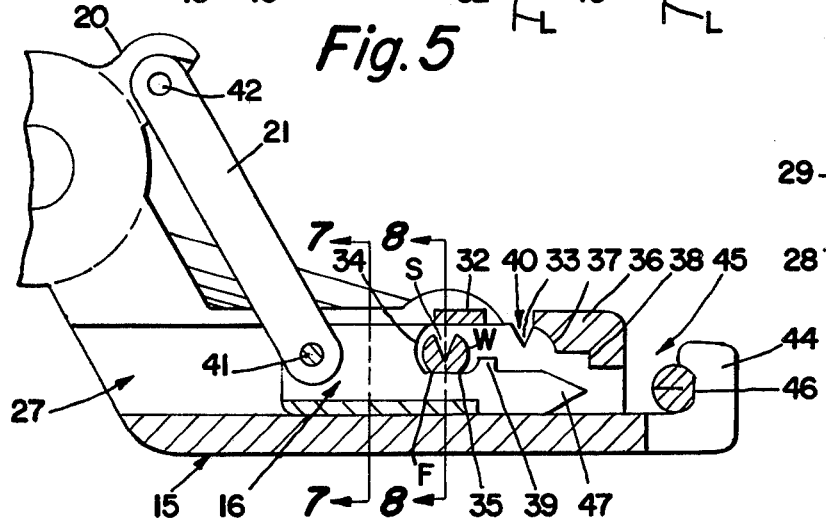
FIG. 6 is a side sectional view of the tool in its open position taken along line 6—6 of FIG. 5.

Referring more particularly to the drawings, and initially to FIGS. 1-4, there is shown the weight attaching tool of the present invention. The tool comprises a base 15 supporting a slidable transfer block 16 which moves back and forth as the weight attachment and removal operations are performed. The base 15 is integrally formed at the forward end of an upper arm or handle 17. A lower arm or handle 18 is attached to the upper arm 17 at a pivot 19 and has a projection 20 at its forward end. A lever 21 connects the forward projection 20 of the lower arm 18 to the transfer block 16. The arms 17 and 18 are designed to be grasped in the hand of the fisherman and to be moved together from an open position (FIG. 4) wherein the transfer block 16 is in its retracted position, to a closed position (FIG. 1) wherein the transfer block 16 is in its forward position.

A feed tube 22 forms a reservoir for storing a plurality of generally cylindrical slotted weights. The forward end 23 of the feed tube is connected to the base 15 and extends perpendicularly from the base. The weights are fed from the feed tube 22 to the base 15 by gravity, eliminating the necessity for complicated spring feed mechanism. The flexible tube 22 curves around and is supported by a flange 24 extending downwardly from the upper arm 17, the flange having a central opening through which the tube 22 is inserted. Preferably, the tube 22 is transparent to enable the fisherman to readily see the number of weights remaining in the reservoir and determine when refilling is necessary. The reservoir is refilled through the rear end of tube 22. A removable cap 25 closes the open rear end of the tube 22 and retains the weights in the reservoir.

Figure 7:
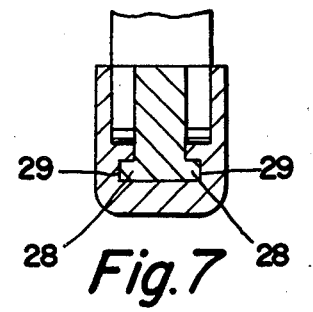
FIG. 7 is a cross sectional view of the tool taken along line 7—7 of FIG. 6.
Figure 8:
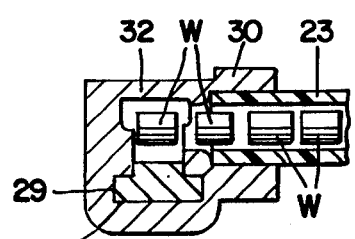
FIG. 8 is a cross sectional view of the tool taken along line 8—8 of FIG. 6.
Figure 9:
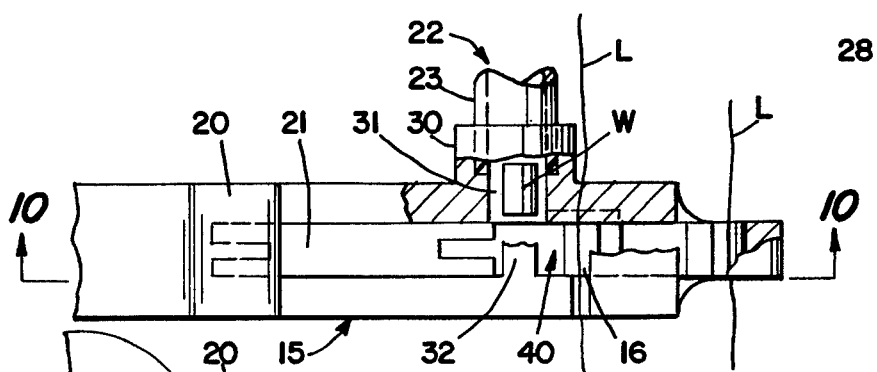
FIG. 9 is a top plan view partially sectioned of the tool similar to FIG. 5, showing the tool in its closed position.

The construction and operation of the base 15 and the transfer block 16 can be seen in greater detail in FIGS. 5-10. The base 15 has a longitudinal channel 27 in which the transfer block 16 is slidably mounted. To retain the block in the channel 27, the block 16 has a pair of outwardly projecting ridges 28 which move within corresponding grooves 29 at the bottom of the channel (FIGS. 7-8). A cylindrical socket 30 is formed on one side of the base 15 for attachment of the forward end 23 of the feed tube 22 (FIGS. 5, 8). The socket 30 has a central opening which communicates with the channel 27 and provides an internal passage for the weights W to enter the channel from the reservoir of the feed tube 22. A covering portion 32 (FIG. 2) across the top of the channel 27 adjacent to the socket 30 prevents the weights entering the channel from the feed tube 22 from inadvertently falling out of the channel. A V-shaped opening or groove 33 is formed in the top of the base, extending laterally on either side of the channel 27. The line L may be positioned in the groove 33 as the weight is being attached.

The transfer block 16 has curved surface 34 and a flat seat 35 for carrying a weight W fed from the reservoir of the feed tube 22. The weight W is carried forward on the seat 35 of the transfer block 16 to an abutment 36 which extends across the top of the channel 27 at the forward end of the channel adjacent to the groove 33. The abutment 36 includes a stationary curved surface 37 against which the weight W is pressed to crimp the weight and close the slot. The abutment 36 also has a recess 38 which is engaged by a stop 39 projecting upwardly on the transfer block 16. An opening 40 in the top of the base (FIGS. 2, 6) is formed between the covering portion 32 and the abutment 36 through which the attached weight may be removed from the channel 27.

Figure 10:
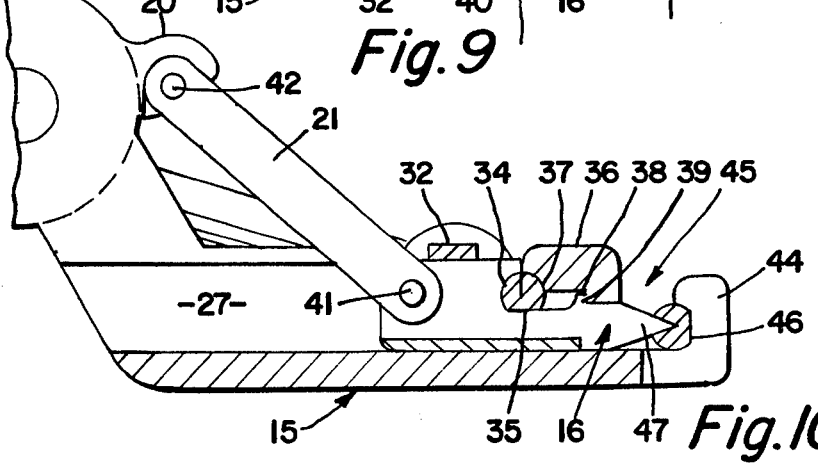
FIG. 10 is a side sectional view of the tool in its closed position taken along line 10—10 of FIG. 9.

At its rearward end, the transfer block 16 is connected to an end of the lever 21 at a pivot 41. The other end of the lever 21 is connected to the projection 20 of the lower arm 18 at a pivot 42. The top of the rear portion of the channel 27 is opened to permit forward movement of the lever 21 (FIG. 10).

Means are provided at the front end of the tool for removing a weight already attached to a fishing line. The removal means includes a hook-shaped extension 44 projecting from the front of the base 15 and integrally connected to the base. The extension 14 forms a nest 45 having a flat vertical surface 46. A weight attached to a line may be placed in the nest 45 with the slot facing the transfer block 16. The forward end of the transfer block 16 has a projecting wedge 47 which is moved forward with the forward movement of the block and which extends beyond the base 15 into the nest 45 when the transfer block is in its forward position (FIG. 10). The wedge 47 moves into the slot in the weight positioned in the nest 45, opening the slot and removing the weight from the line.

Figure 11:
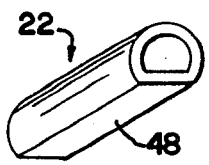
FIG. 11 is a detailed view of the feed tube used as a reservoir for the weights.
Figure 12:
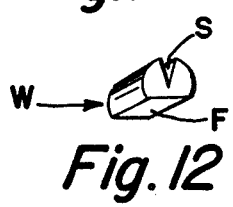
FIG. 12 is a detailed view of a preformed weight for use with the tool of the present invention.

As shown in FIG. 11, the feed tube 22 is generally tubular with a single flat side 48 which aligns the slotted weights in the tube and maintains the weights in the proper orientation. As shown in FIG. 12, the generally cylindrical weights W are preferably formed with the slot S opposite a flat alignment surface F. The flat side 48 of the feed tube thus engages the flat alignment surface F on the weights to maintain the slots in the proper position as the weights are fed through the tube 22 to the channel 27. At the forward end 23 of the feed tube, the flat side 48 is at the bottom of the tube 22 (FIG. 8) so that the slots S face upwardly. As each weight W enters the channel 27, the flat bottom surface F of the weight W rests upon the flat seat 35 of the transfer block 16 so that the slot S continues to face upwardly. The maintenance of the slot in an upwardly facing orientation permits the insertion of the line L into the slot S so that the line may be attached to the weight.

In the operation of the attachment tool of the present invention, the feed tube 22 is filled with pre-slotted weights in proper alignment. Before filling, the arms 17 and 18 should be moved together to place the tool in the closed position (FIG. 1), so that the transfer block 16 blocks the forward end 23 of the feed tube 22. The cap 25 is removed and the feed tube 22 is filled with weights with the flat orienting surface F on each weight facing downwardly, and the slot S facing upwardly. Due to the unique construction of the feed tube 22 with its flat side 48, it is difficult, if not impossible, to insert the weights into the feed tube in an improper orientation. After the feed tube 22 has been filled with weights, the tool is tilted at an angle to provide a downward flow of the weights toward the base 15. The arms 17 and 18 are moved apart, and the transfer block 16 is retracted to allow a single weight to drop from the forward end 23 of the feed tube 22 into the channel 27 and onto the flat seat 35 of the transfer block 16. With the weight on the seat 35, the arms 17 and 18 are moved together until the slot S in the weight is aligned with the groove 33 in the base 15 and the weight comes in contact with the abutment 36. The line L is placed into the groove 33 on the base 15 and into the slot in the weight. The arms 17 and 18 are then moved further together as the tool is squeezed in the hand of the operator. This moves the transfer block 16 further forward and crimps the weight between the curved surface 37 of the abutment 36 and the curved surface 34 of the transfer block 16. The tool may be squeezed as tightly as possible, since undesirable deformation of the weight resulting from too much pressure is prevented by engagement of the stop 39 on the transfer block 16 with the recess 38 in the abutment 36. After the weight has been crimped and secured to the line, the arms 17 and 18 are moved apart once again, and the transfer block 16 is retracted to permit removal of the weight through the opening 40 in the channel 27. If more than one weight is required, the attachment operation is repeated. After the last weight has been attached and removed from the tool, the arms 17 and 18 are moved together and the tool may be stored in its closed position.

To remove a weight already attached to the line, the arms 17 and 18 are moved apart slightly until the wedge 47 at the forward end of the transfer block 16 is retracted into the channel 27, permitting a weight to be placed into the nest 45 formed by the hook-shaped extension 44 at the front of the base 15. The weight is placed in the nest 45 with the closed slot S facing the wedge 47 and the flat orienting surface F against the flat surface 46 of the extension 44. The arms 17 and 18 are then moved together to advance the transfer block 16 and force the wedge 47 into the slot S in the weight, opening the slot and removing the weight from the line L. The arms 17 and 18 may be fully moved apart if the device has been tilted so that the feed tube 22 is in a downward position, preventing a weight from dropping from the forward end 23 of the feed tube into the channel 27. After the slot has been opened, the arms 17 and 18 are again moved apart to retract the wedge 46 from the nest and permit removal of the detached weight.

Various modifications to the preferred tool disclosed should be apparent to those skilled in the art. For example, the tool may be constructed to accept different sizes and shapes of weights. For instance, larger or smaller weights could be used, or round or rectangular shapes could be used, if the proper orienting surface is provided to maintain the weights with a slot facing upwardly as each weight enters the channel. The weights may also be fed vertically into the channel 27 from the top instead of from the side by changing the location and configuration of the feed tube 22, so that the forward end 23 is connected to the top of the base 15. In place of the pair of pivoted arms 17 and 18, the movement of the transfer block can be accomplished by other means such as gears, gear racks, springs, or cams. The pair of pivoted arms 17 and 18, however, is preferred due to its simplicity of operation and the relatively small number of fabricated parts. It is also possible that the device could be used or adapted for attaching weights for other purposes besides fishing lines.

While the invention has been shown and described with respect to a specific embodiment, this is intended for the purpose of illustration rather than limitation, and other modifications will be apparent to those skilled in the art all within the spirit and scope of the invention.

What is claimed is:

1. A tool for attaching slotted weights to a line comprising:
    a base having a channel and having an opening for insertion of the line traversing said channel, and having an abutment across said channel adjacent to said opening;
    a reservoir adapted to store a plurality of slotted weights and to discharge individual slotted weights into said channel, said reservoir extending perpendicularly from and communicating with said channel, said reservoir being generally tubular with a single flat interior side for maintaining in proper alignment a plurality of generally cylindrical weights having a flat surface opposite the slot;
    a transfer block slidable within said channel, said block adapted to urge a slotted weight discharged from said reservoir against said abutment to close the slot and attach the weight to the line; and
    means for moving said transfer block within said channel.

2. A tool for attaching slotted weights to a line comprising:
    a base having a channel and having an opening for insertion of the line traversing said channel, and having an abutment across said channel adjacent to said opening;
    a reservoir adapted to store a plurality of slotted weights and to discharge individual slotted weights into said channel, said reservoir extending perpendicularly from and communicating with said channel;
    a transfer block slidable within said channel, said block adapted to urge a slotted weight discharged from said reservoir against said abutment to close the slot and attach the weight to the line;
    means for moving said transfer block within said channel; means attached to said base for receiving a weight previously attached to a line; and
    a weight removal device movable with said transfer block and adapted to open the closed slot in the weight in said receiving means and remove the weight from the line.

3. A tool for attaching slotted weights to a fishing line comprising:
    a base having a longitudinally extending channel and having a groove for insertion of the line traversing said channel, and having an abutment across said channel adjacent to said opening;
    a generally tubular reservoir adapted to store a plurality of generally cylindrical slotted weights having a flat surface opposite the slot and to discharge by gravity individual weights laterally into said channel, said reservoir having a single flat interior side for engaging the flat surface of the weights and for maintaining the weights in proper alignment, said reservoir extending laterally from and communicating with said channel;
    a transfer block slidable within said channel in said body, said block adapted to urge a slotted weight discharged from said reservoir against said abutment to close the slot and attach the weight to the line;
    means attached to said base for receiving a weight already attached to a fishing line;
    a weight removal device movable with said transfer block and adapted to open the closed slot in the weight in said receiving means to remove the weight from the line;
    a pivoted pair of arms, one of which is attached to said base; and
    a lever connected between the other of said arms and said transfer block for moving said transfer block with said channel in said base.

4. A tool as in claim 3 wherein said transfer block has a flat seat adapted to carry the weight with its flat surface facing downwardly and its slot facing upwardly.

5. A tool as in claim 3 wherein said transfer block has a stop which engages a portion on said base to prevent undesired additional forward movement of said transfer block beyond that desired to close the slot in the weight.

6. A tool as in claim 3 wherein said weight removal device is a wedge on the front of said transfer block.

7. A tool as in claim 3 wherein said reservoir includes a detachable cap on the end opposite the channel for removal when filling the reservoir with weights.

8. A tool as in claim 3 wherein said reservoir is made of transparent material to permit the weights therein to be readily seen.

* * * * *